(12) United States Patent  
Mindeman

(10) Patent No.: US 7,580,781 B2
(45) Date of Patent: Aug. 25, 2009

(54) DIAGNOSTIC SYSTEM FOR A POWER MACHINE

(75) Inventor: Spencer L. Mindeman, Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 75 days.

(21) Appl. No.: 11/302,608

(22) Filed: Dec. 14, 2005

(65) Prior Publication Data

US 2007/0135977 A1 Jun. 14, 2007

(51) Int. Cl.
*G06F 19/00* (2006.01)
(52) U.S. Cl. .......................... 701/29; 340/438
(58) Field of Classification Search .................. 701/29; 340/438

See application file for complete search history.

(56) References Cited

U.S. PATENT DOCUMENTS

| 3,906,437 | A | 9/1975 | Brandwein et al. ............ 340/27 |
| 5,949,330 | A | 9/1999 | Hoffman et al. ............ 340/438 |
| 6,285,932 | B1* | 9/2001 | de Bellefeuille et al. ...... 701/33 |
| 6,320,497 | B1 | 11/2001 | Fukumoto et al. ......... 340/425.5 |
| 6,343,237 | B1 | 1/2002 | Rossow et al. ................ 700/83 |
| 6,493,616 | B1 | 12/2002 | Rossow et al. ................ 701/29 |
| 6,826,465 | B2 | 11/2004 | Ishimoto et al. .............. 701/50 |
| 6,999,869 | B1* | 2/2006 | Gitlin et al. ................. 701/115 |
| 2002/0077780 | A1* | 6/2002 | Liebl et al. ................. 702/183 |
| 2002/0154003 | A1 | 10/2002 | Ueda ........................... 340/425 |
| 2003/0028269 | A1* | 2/2003 | Spriggs et al. ................ 700/83 |
| 2004/0158367 | A1 | 8/2004 | Basu et al. ................... 701/29 |

OTHER PUBLICATIONS

International Search Report from corresponding PCT application PCT/US06/46733.

\* cited by examiner

*Primary Examiner*—Mark Hellner
(74) *Attorney, Agent, or Firm*—Westman, Champlin & Kelly, P.A.

(57) ABSTRACT

A diagnostic application or system for a power machine is disclosed. The diagnostic application or system generates a diagnostic menu to select one or more diagnostic items for diagnostic monitoring. Sensor data for the selected items is retrieved from one or more sensors and displayed on an electronic display device. In the embodiments described, the application or system includes a graphical user interface component configured to generate a display options menu including one or more user selectable display formats or options.

19 Claims, 9 Drawing Sheets

DIAGNOSTIC SYSTEM FOR A POWER MACHINE

BACKGROUND OF THE INVENTION

Power machines or vehicles typically have sensors which provide readings or data for different operating parameters of the machine or vehicle. For example, power machines, such as a skid steer loader, typically have temperature and pressure sensors to monitor hydraulic oil pressures and temperatures, engine coolant temperatures and other system parameters. Feedback or data from sensors can be outputted to a screen or display to warn of a potential problem or used for diagnostic evaluation. Sensor data allows a technician to view operating performance over a period of time and under different operating conditions. Review and analysis of a large volume of sensor data can be burdensome.

SUMMARY OF THE INVENTION

The present invention relates to a diagnostic application or system for a power machine. The application or system includes a menu generator that is configured to generate a diagnostic menu including one or more user selectable diagnostic items or a display options menu including a plurality of user selectable display formats or options. A user selects one or more diagnostic items or display formats through an input device such as a pointing device. Sensor data for the selected items is retrieved from one or more sensors on the power machine. In the embodiments described, the application includes a graphical display generator to graphically display sensor data on an electronic display device or monitor. The above summary is a brief overview of subject matter of the application and is not intended to identify key features or essential features of the claimed subject matter. The above summary is not intended to be used as an aid in determining the scope of the claimed subject matter.

DETAILED DESCRIPTION OF ILLUSTRATIVE EMBODIMENTS

Figure 1:
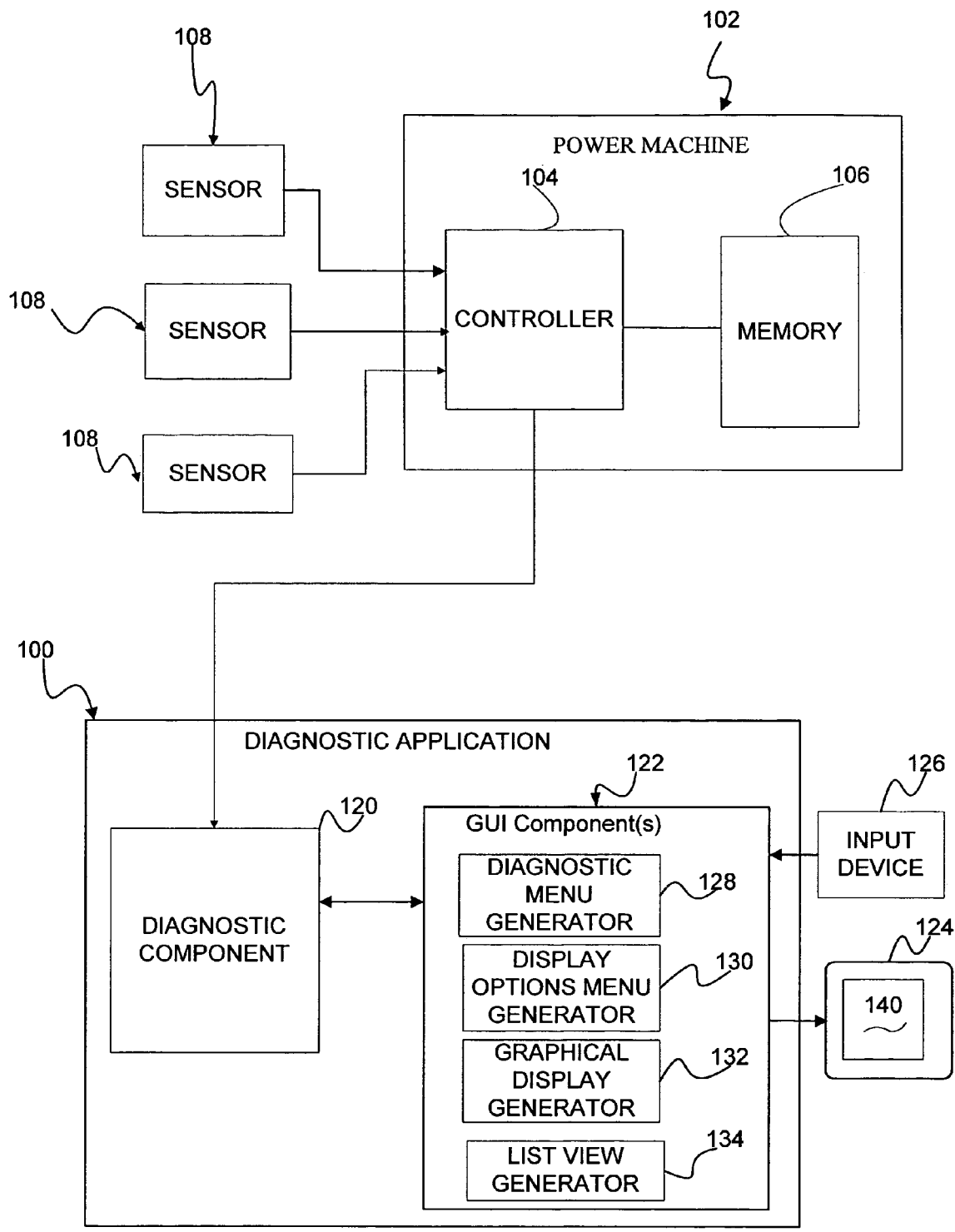
FIG. 1 is a schematic illustration of an embodiment of a diagnostic application for a power machine.

The present application relates to a diagnostic application 100 that can be implemented on a personal computer, hand held computer or other programming device, for use in association with a power machine or vehicle 102 illustrated diagrammatically in FIG. 1. As shown in FIG. 1, power machine 102 includes a controller 104, memory 106 and one or more sensors 108 to monitor system parameters. Controller 108 is illustratively a digital computer, microprocessor or microcontroller and memory 106 can be integrated with controller 106 or provided separately. Sensors 108 can include temperature, pressure or other "on-board" or "off-board" sensors to monitor engine temperature, oil pressure or temperature, hydraulic oil charge pressure or other diagnostic parameters.

The diagnostic application 100 is configured to retrieve, manipulate and display data from the sensors 108. As shown, the diagnostic application 100 includes a diagnostic component 120 and a graphical user interface component 122 to provide a user interface with the application program. The diagnostic component 120 is configured to retrieve sensor data from the sensors 108 coupled to power machine 102. Data is retrieved or downloaded to the diagnostic component 120 through a cable connection between the controller 104 and the programming device or computer running the diagnostic application or program 100.

In one embodiment, diagnostic application or component 120 is coupled to the power machine or controller 104 through a service tool controller or communication converter (not shown). The converter converts the machine communication SAE J1939 (CAN communication) protocol to RS_232 serial protocol of the diagnostic application or component 120.

The diagnostic application 100 receives commands to download or display data through a graphical user interface generated by the graphical user interface component 122. The graphical user interface is displayed on an electronic display device 124, such as a monitor or LCD display. A user interfaces with the application program 100 through the graphical user interface to select or implement different tasks associated with the application program via input device 126. Illustratively, the input device 126 can be a pointing device, mouse, touch screen or other device. The graphical user interface features or functions are generated in cooperation with various program objects or modules through various application program interfaces as is known in the art.

In the illustrated embodiment, the graphical user interface component 122 includes a diagnostic menu generator 128, a display options menu generator 130, a graphical display generator 132, and a list view generator 134. The diagnostic menu generator 128 is configured to generate a diagnostic menu including one or more diagnostic menu items that are selected through the input device 126. The display options menu generator 130 is configured to generate an options menu including a plurality of user selectable display options which are invoked or activated through the input device 126. The graphical display generator 132 generates a graphical display for user selected diagnostic items and the list view generator 134 generates a list display for the selected diagnostic items as will be described.

Figure 2:
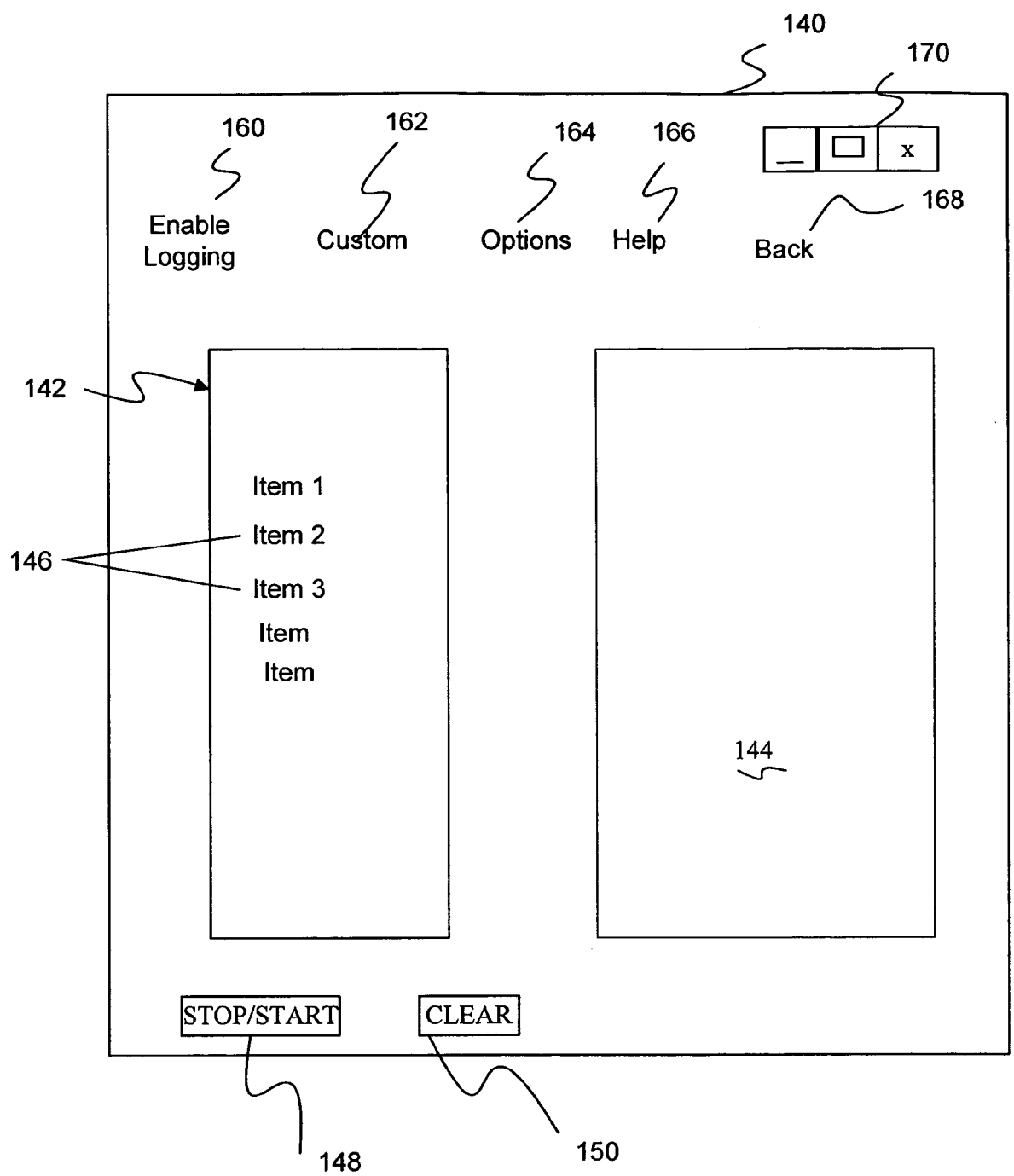
FIG. 2 is a schematic illustration of an embodiment of a graphical user interface screen for a diagnostic application for a power machine.

FIG. 2 illustrates one embodiment of a graphical user interface screen 140 generated by the graphical user interface component 122 of the application program for display on the electronic display device 124. As shown, the screen 140 includes a diagnostic menu segment 142, data display segment 144 and various function and control icons or buttons. The diagnostic menu segment 142 is generated by the diagnostic menu generator 128 and as shown includes a menu of user selectable diagnostic items 146. Items 146 on the menu are selected through the input device 126. For example in an illustrative embodiment, various menu items 146 are selected by "pointing and clicking" on a desired item using a pointing device (not shown). Multiple items can be selected using a CTRL key on a keyboard input device (not shown). The diagnostic component 120 is configured to retrieve sensor data for the selected diagnostic items 146 as will be described.

The various control buttons on the screen 140 include a Start/Stop button or icon 148 and "Clear" button or icon 150 that are positioned in a lower portion of the screen 140. The "Start/Stop" button 148 initiates and stops the data retrieval process for the selected diagnostic items and the "Clear" button 150 clears the data display segment 144 and stop data capture. User selectable functions on the screen 140 include an "Enable Logging" function 160, a "Custom" function 162, "Options" function 164, "Help" function 166 and a "Back" function 168. These functions are activated through the input device 126 as previously described. The screen 140 also includes icons 170 to minimize or maximize the screen window or exit the application or window.

Activation of the "Enable Logging" function 160 allows a user to save data to a data file (using for example a "cvs" file format). The "Custom' function 162 allows a user to customize the diagnostic application for a particular machine or use. The "Options" function 164 allows the user to specify different display formats or options. The "Help" function 166 provides text help on a variety of user selectable topics and the "Back" function 168 allows the user to undo a previous invoked function or task.

Figure 3:
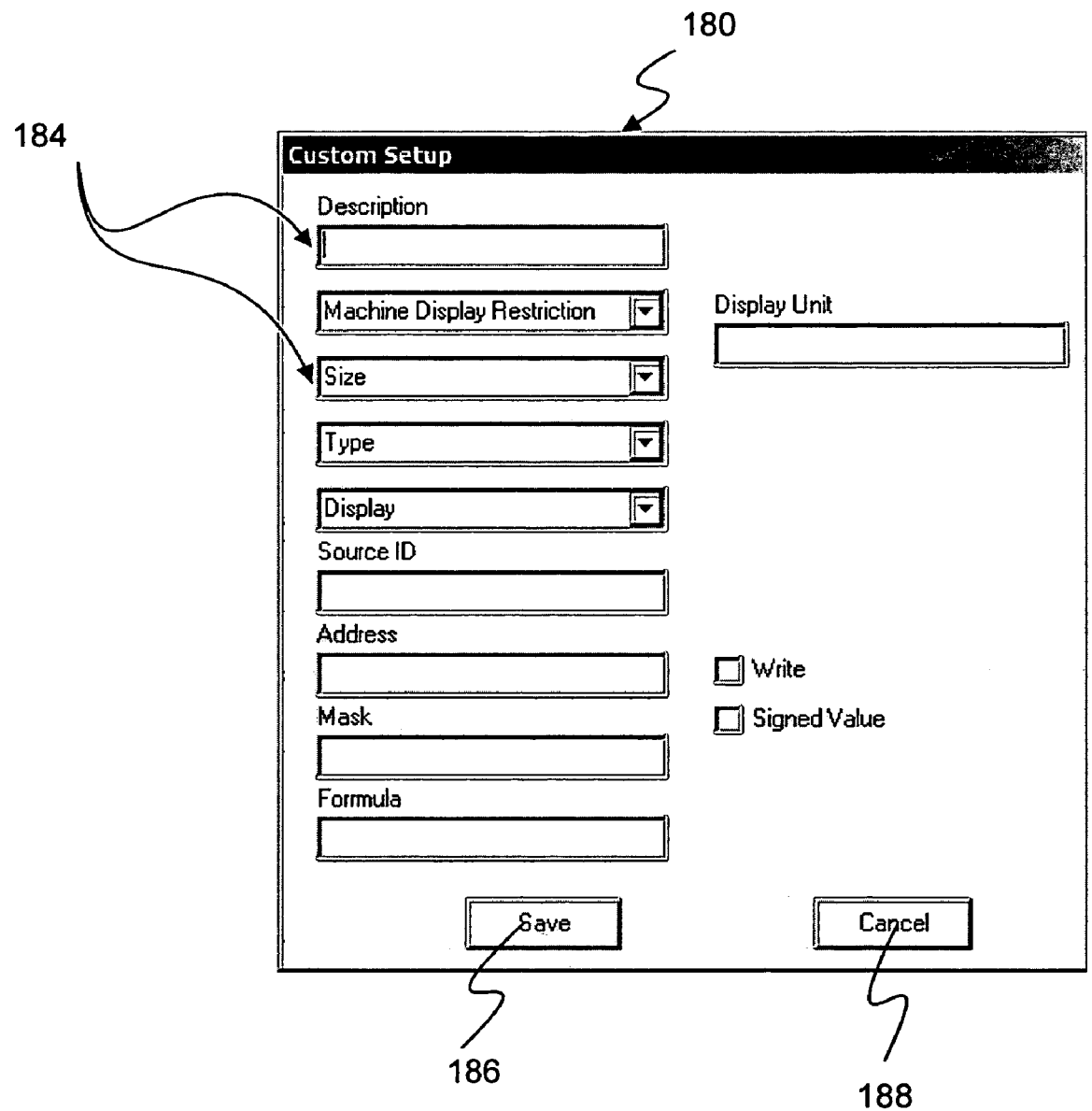
FIG. 3 illustrates an embodiment of a custom setup function screen or window for a diagnostic application for a power machine.

Selection of the "Custom" function invokes the graphical user interface component 122 to generate a data entry template 180 as illustrated in FIG. 3. The template 180 allows the user to input custom diagnostic parameters for a particular machine to configure the diagnostic component 120 to retrieve data for different power machines or sensor configurations. This function allows the user to configure the application for different machines and sensor configurations. The template 180 includes a plurality of input fields 184 including Description, Machine Display Restriction, Size, Type, Display, Source ID, Address, Mask, Formula, Display Unit, Write and Signed Values. The user can save the custom input by selecting a save button 186 or can press a cancel button 188 to exit without saving the custom input data. Alternatively, the user can select from a list of pre-configured machine and/or diagnostic parameters (not shown).

Figure 4:
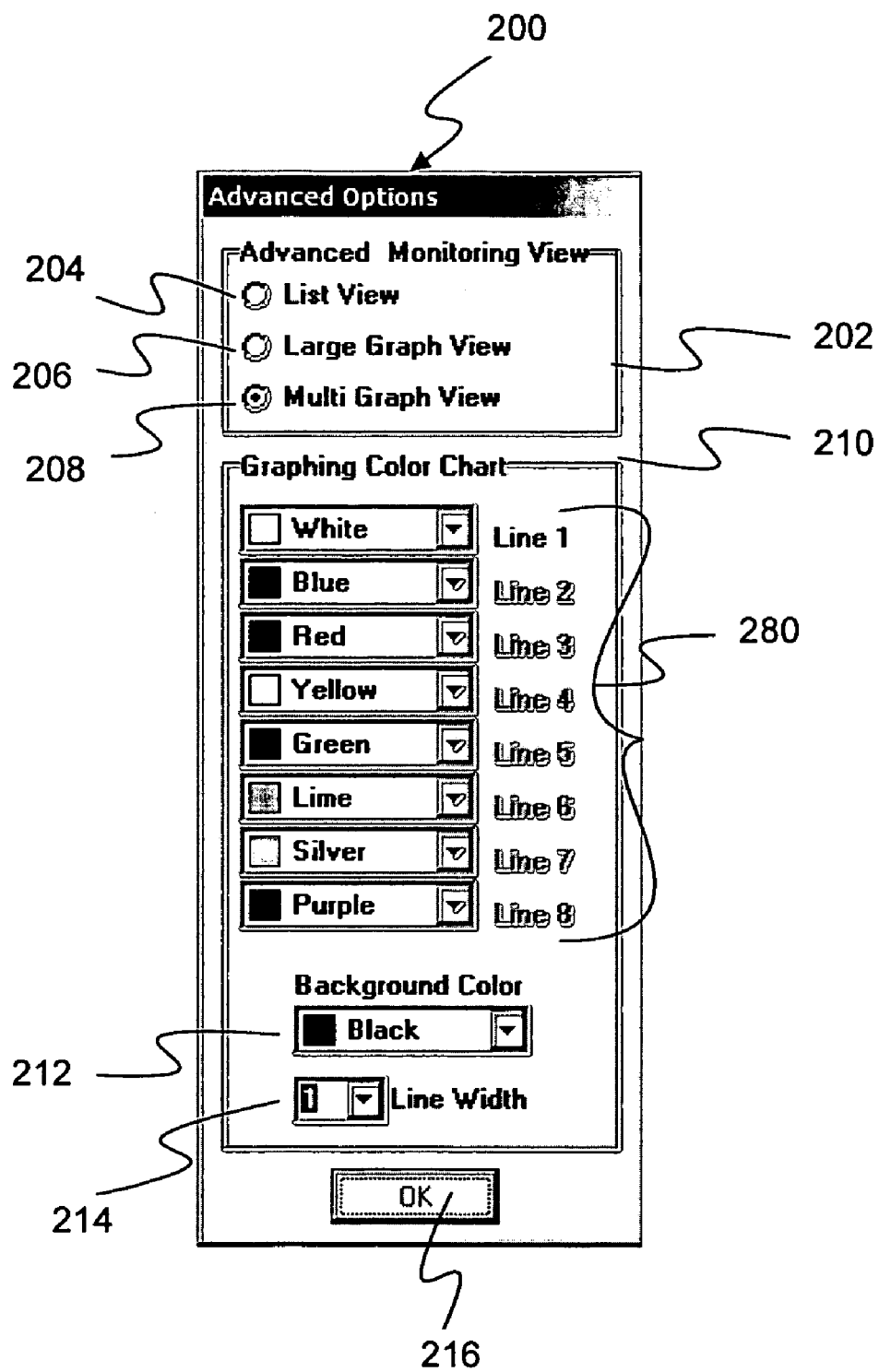
FIG. 4 illustrates an embodiment of a screen or window for an options function.

Selection of the "Option" function 164 invokes the display option menu generator 130 to generate an options menu or window 200, an embodiment of which is shown in FIG. 4. As shown the menu 200 includes a plurality of user selectable display formats 202 including a List View format, Large Graph View format and Multi Graph View format and various color and line display options. The user chooses the desired format by selecting one of the List View, Large Graph View or Multi Graph View selection frames 204, 206, 208 on the menu 200. In addition, the user can select line color from a graphing color chart 210, background color 212 and line width 214. Once the user completes selection of the desired "options", the user selects an "OK" button 216 to activate the selected formats or options. Depending upon the activated display format, the graphical user interface component 122 generates different data display segments 144 corresponding to the selected display formats.

Figure 5:
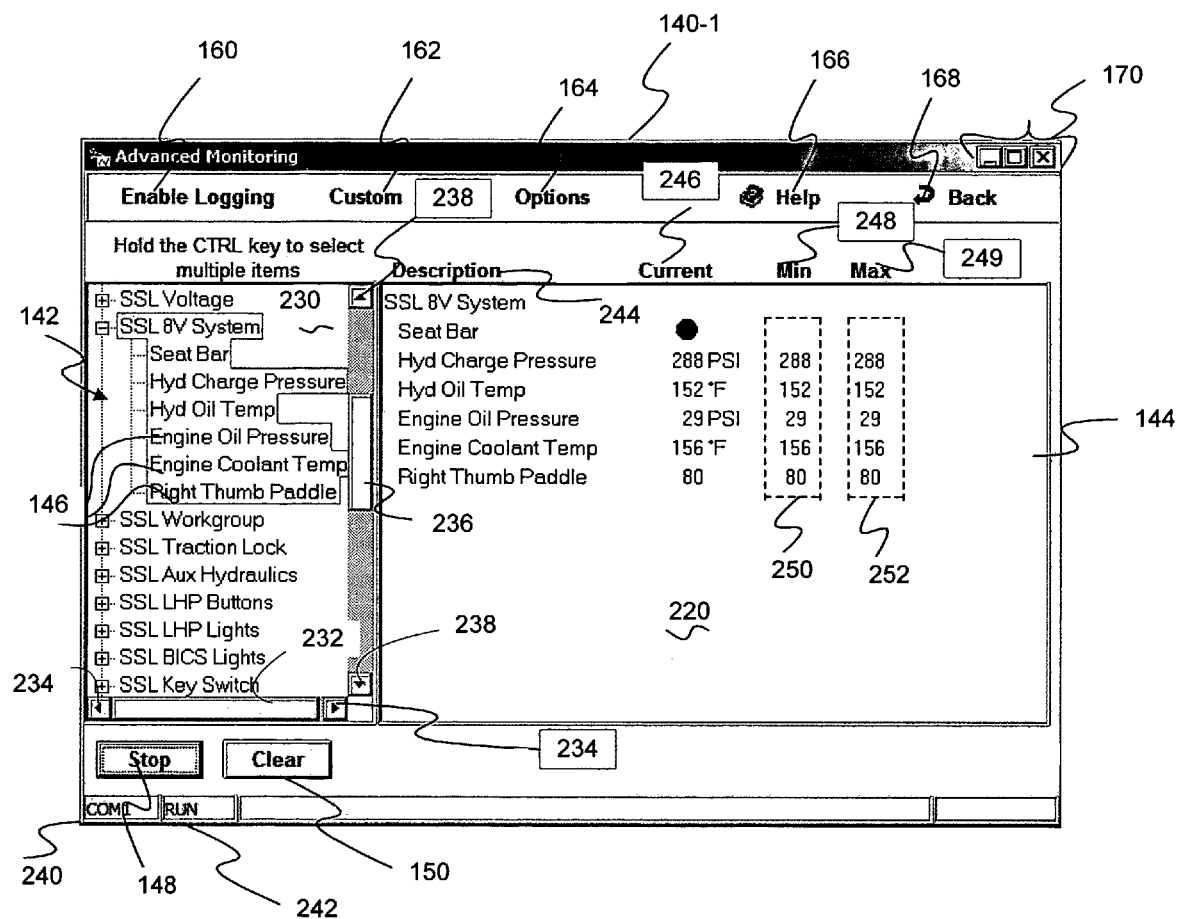
FIG. 5 illustrates an embodiment of a screen including a list view display.

FIG. 5 illustrates a graphical user interface 140-1 which is generated for the List View format. In FIG. 5, the List View format is active and the data display segment 144 includes a list view display 220 which is described in more detail below. As shown in FIG. 5, the diagnostic menu segment 142 of the graphical user interface 140-1 includes a scrollable diagnostic menu 230 having horizontal and vertical scroll functions implemented through a horizontal scroll bar 232 and right/left scroll tabs 234, and vertical scroll bar 236 and up/down scroll tabs 238. Activation of the scroll bars 232, 236 or scroll tabs 234, 238 allows a user to view different portions of the scrollable menu 230. In the embodiment shown, the scrollable diagnostic menu 230 includes item selections for SSL 8V System including "Seat Bar", "Hydraulic Charge Pressure", "Hydraulic Oil Temp", "Engine Oil Pressure", "Engine Coolant Temp", "Right Thumb Paddle", etc.

As previously discussed, once the diagnostic items 146 are selected, the user activates the monitoring process using a button 148 which toggles between a Start mode and a Stop mode. Prior to activation of the data retrieval process, the button 148 is in the Start mode. Selection of button 148 in the Start mode activates retrieval of the sensor data for the selected diagnostic items 146 at predefined intervals.

Once the data retrieval process is activated, the screen displays COMI and RUN status labels 240, 242 to indicate to the user that the application is in a data retrieval mode. Following activation, button 148 toggles to the Stop mode as shown in FIG. 5 to provide a user interface to stop the data capture or retrieval process.

The retrieved data is displayed in the data display segment 144 which as previously discussed includes the list view display 220 for the active list view format. The list view display 220 includes an item description field 244, current data field 246, a maximum data field 248 and a minimum data field 249 for each of the selected diagnostic items. The description field 244 includes a text description of the diagnostic item. The current, minimum and maximum data fields 246, 248, 249 include current, minimum and maximum sensor readings, respectively.

In the embodiment shown the graphical user interface component 122 generates an alternate data display function on the graphical user interface as illustrated by blocks 250, 252. When invoked, the alternate display function retrieves acceptable maximum and/or minimum sensor values and outputs them in the maximum and minimum data fields 248, 249. The acceptable maximum and minimum sensor values are retrieved from information in memory 106 of the power machine or other data store (not shown).

Figure 6:
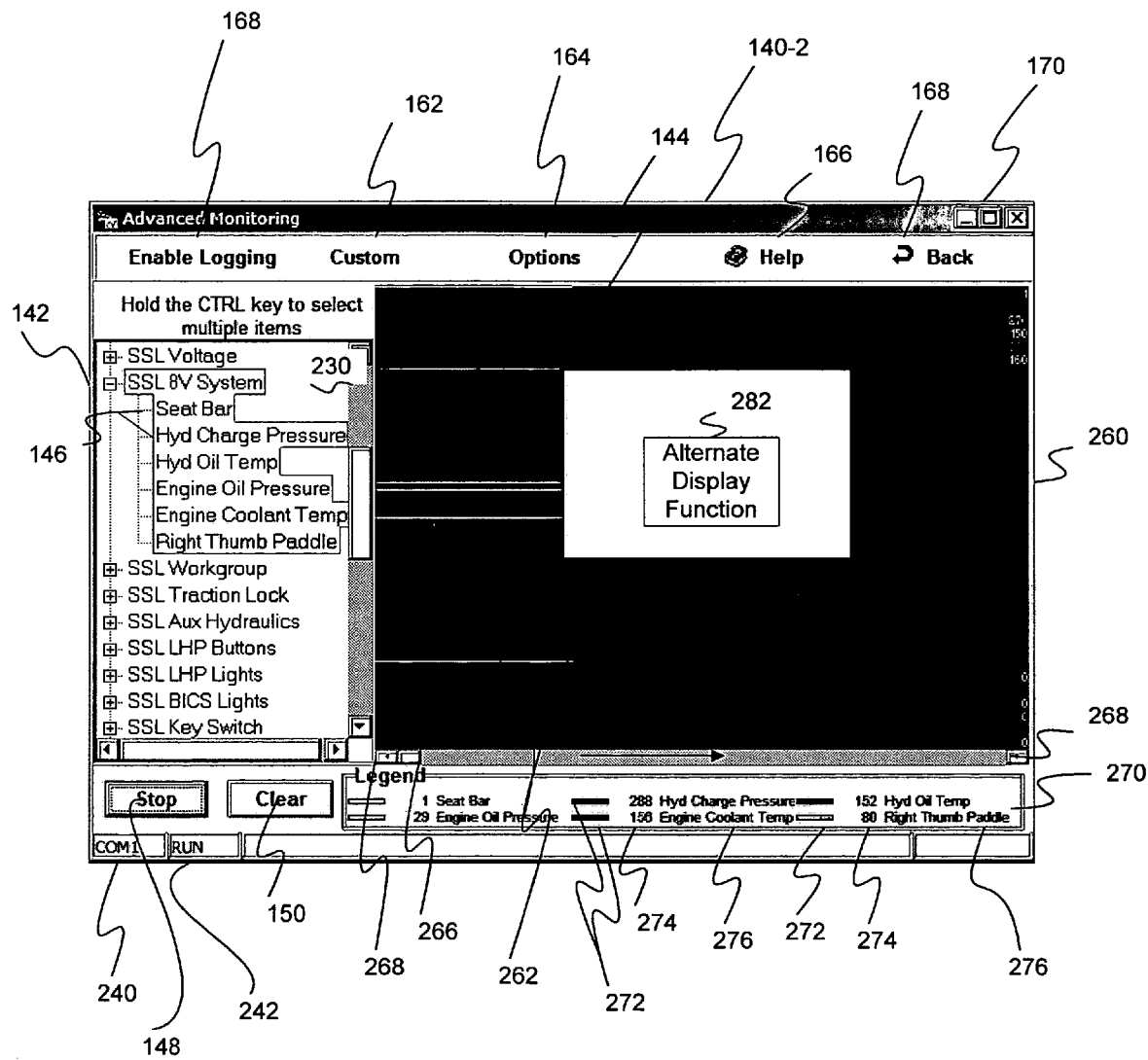
FIG. 6 illustrates an embodiment of a screen including a composite graphical display

FIG. 6 illustrates a graphical user interface screen 140-2 for the large graph view format where like numbers are used to refer to like parts in the previous FIGS. In the embodiment shown, the data display segment 144 includes a composite graph display generated by the graphical display generator 132. The composite graph display includes a scrollable composite graph segment 260 including one or more line graphs 262 for each of the selected diagnostic items. The line graphs 262 plot sensor data along a time axis for each of the selected diagnostic items. The graphs 262 are plotted in real time and are scaled relative to maximum and minimum readings. The graphical display 132 generator is configured to automatically re-scale the graphs based a change in the maximum and minimum sensor readings. Thus, for a graph scale between 1-100, the generator 132 is configured to automatically re-scale graphs 262 for a sensor reading above 100.

As shown, the scrollable composite graph segment 260 includes a horizontal scroll function including a horizontal scroll bar 266 and scroll tabs 268. Data is continuously displayed along a horizontal scroll axis in real time. A user can scroll along the x- or time axis using scroll bar 266 or arrow tabs 268 to review past data or to advance the display to view a text display of acceptable maximum and minimum data (not visible in FIG. 6) for the each of the diagnostic items.

The one or more line graphs 262 of the composite graph segment 260 are distinguished by a legend 270 including a plurality of legend symbols 272. The legend also includes a sensor data field 274 and a diagnostic item description 276. The legend symbols 272 associate the graphs 262 of the composite graph segment 260 to the appropriate diagnostic item description 276 and sensor data in the legend 270. Various legend symbols can be used to distinguish the graphs 262 of the composite graph segment 260.

In the embodiment of FIG. 6, the composite graph segment 260 includes different line or graph colors for each diagnostic item. The different colored graphs or lines 262 are associated to the respective diagnostic items using a color bar for the legend symbol 272. The color selection for each graph or line is pre-defined by the user through the graphing color chart 210 of the options menu 200 previously illustrated in FIG. 4. As shown in FIG. 4, the graphing color chart 210 includes a plurality of graph line inputs 280 (e.g. Lines 1-8) to pre-define color selections for each graph 262 of the composite graph segment 260. For example, in FIG. 4, input for Line 1 is white to output a white graph or line and associated white color bar for first diagnostic item. Additional colors are selected for additional diagnostic items in Lines 2-8 of the graphing color chart 210.

In the illustrated embodiment of FIG. 6, the legend 270 includes an alternate data display function 282 that is invoked through the graphical user interface to display numeric sensor data for a selected data point on the graphs 262 of the composite graph segment 260. To invoke the alternate data display function 282, a user positions a pointing device or other input device proximate to the desired data point on screen 140-2 and activates the select function on the input device 126. Upon activation of the alternate data display function 282, the numeric value of the selected data point is displayed in the data field 274 corresponding to the item description 276 for the graph.

Figure 7:
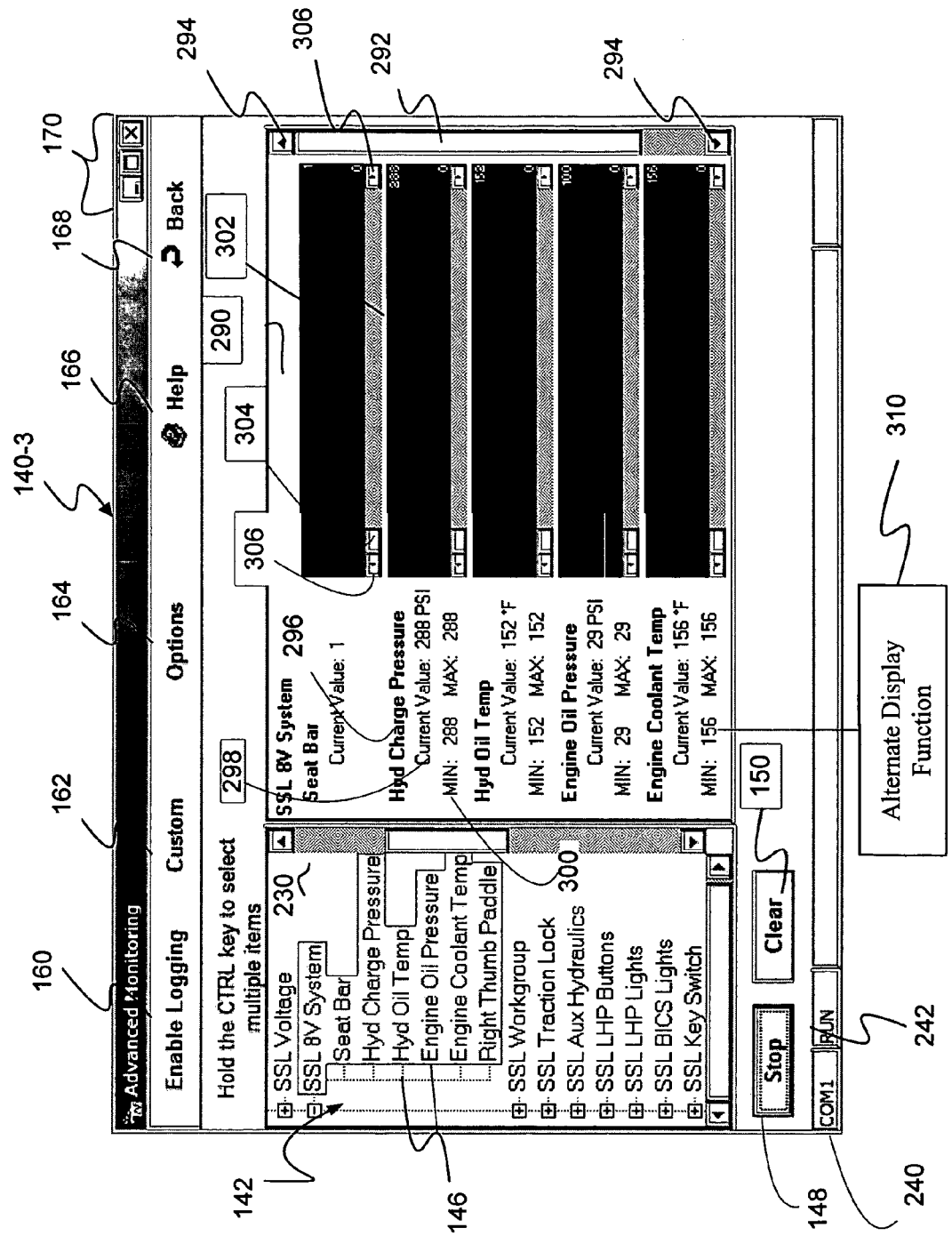
FIG. 7 illustrates an embodiment of a screen including a graphical display having a plurality of segregated graph segments for selected diagnostic items.

FIG. 7 illustrates an embodiment of a graphical user interface screen 140-3 implementing a multi graph view format. As shown, the screen 140-3 for the illustrated multi-graph view format includes a scrollable display segment 290 including a vertical scroll function. The vertical scroll function includes a vertical scroll bar 292 and scroll tabs 294. The scrollable display segment 290 includes an item description 296, current data field 298, "MAX" and "MIN" data fields 300, and scrollable segregated graph segments 302 for the selected diagnostic items. The scrollable segregated graph segments 302 are generated by the graphical display generator 132 and include a horizontal scroll function. As shown, the horizontal scroll function includes a horizontal scroll bar 304 and scroll tabs 306. Each of the segregated graph segments 302 includes a graph for one of the user selected diagnostic items. The graphs are scaled relative to the maximum and minimum data values. As previously discussed with respect to the composite graph display, the graphical display generator 132 is configured to continuously plot sensor data along the time axis. The graphs of the segregated graph segments 302 are re-scaled based upon a change in maximum and minimum sensor readings as previously described.

The scrollable display segment 290 includes an alternate display function 310 which is activated to view acceptable maximum and minimum sensor values. The alternate display function 310 is invoked through the graphical user interface by "pointing and clicking" on the "MAX" and "MIN" data fields 300. As previously discussed, upon activation, the alternate display function 310 retrieves the maximum acceptable and minimum acceptable values for the selected diagnostic items and displays the acceptable values instead of the maximum and minimum data readings in the "MAX" and "MIN" data fields 300.

Figure 8:
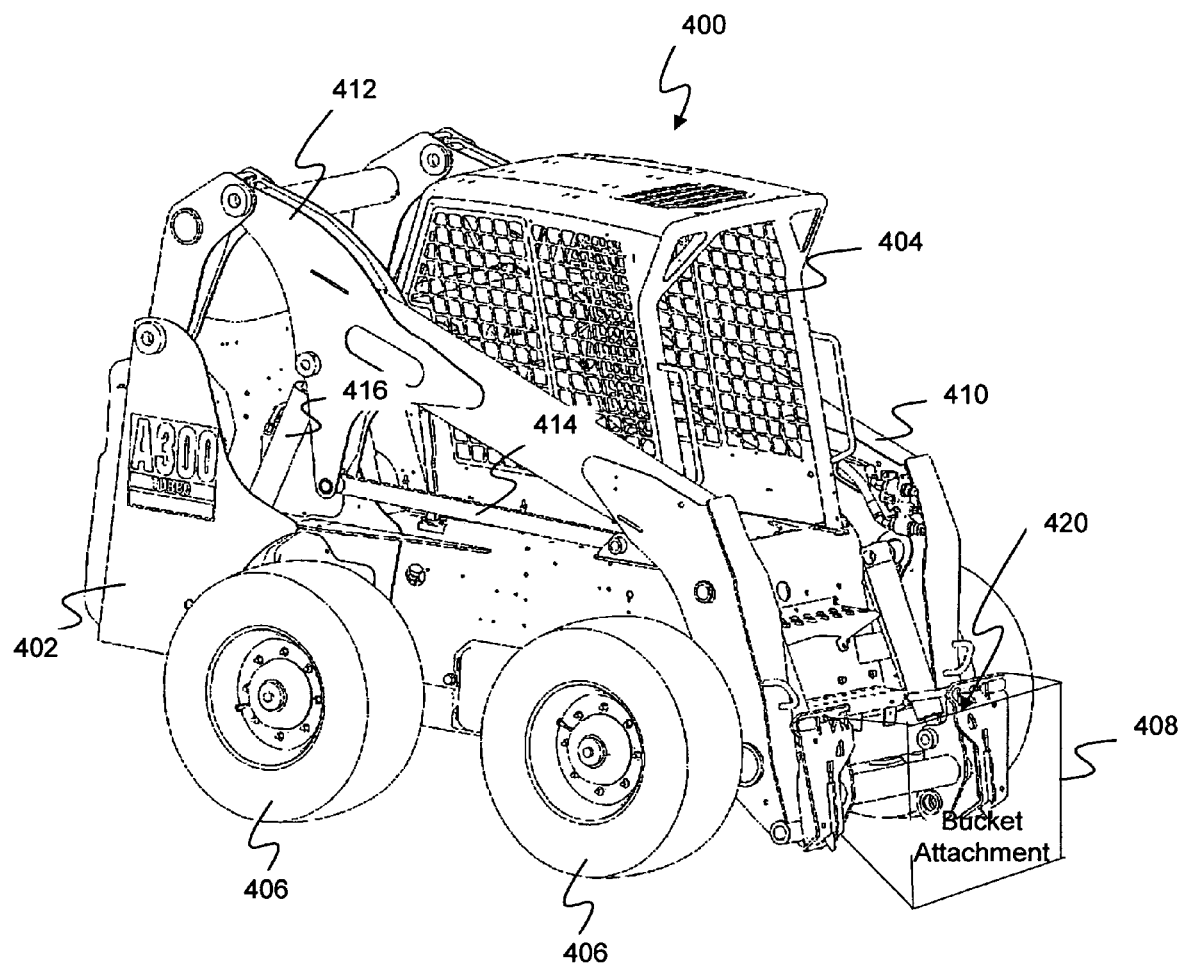
FIG. 8 illustrates one embodiment of a power machine or skid steer loader.

As previously discussed, the diagnostic application 100 is used to monitor operations or parameters of a power machine, such as a skid steer loader 400 illustrated in FIG. 8. As shown, the skid steer loader 400 includes a vehicle body or frame 402 and operator cab 404. Wheels 406 are coupled to the frame 402 so that the loader 400 can move over the ground during use. Alternatively, the loader vehicle can use a track instead of wheels.

A bucket or other attachment 408 (illustrated schematically in FIG. 8) is connected to the loader 400 and raised or lowered via lift arms 410 coupled to the body 402 via linkage 412 and tie rod 414. Fluid cylinders or actuators 416 (only one shown in FIG. 8) are coupled to the body 402 and lift arms 410 to provide vertical lift to the bucket or attachment 408. The bucket or attachment 408 is rotated hydraulically relative to the lift arms 410 through tilt linkage 420. In illustrated embodiment, the skid steer loader 400 can include engine sensors, hydraulic pressure sensors and temperature sensors, engine oil or coolant temperature sensors. The diagnostic application as described in the present application retrieves sensor data from the skid steer loader 400 to provide diagnostic monitoring or analysis. The diagnostic system described has application for different power machines, such as excavators or other power machines, and application is not limited to the skid steer loader shown in FIG. 8.

Figure 9:
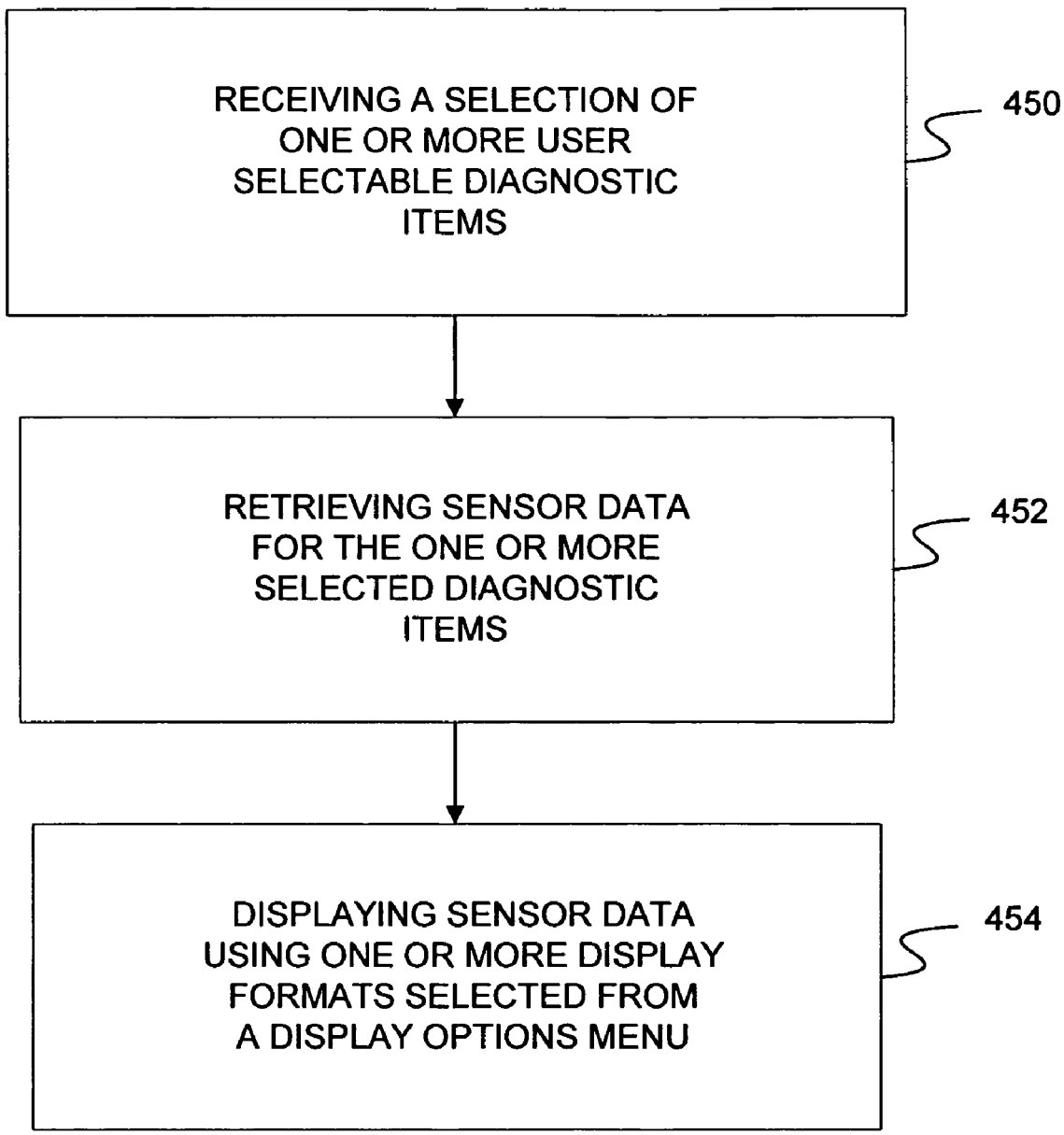
FIG. 9 is a flow chart for diagnostic monitoring.

FIG. 9 is a flow chart illustrating steps for implementing diagnostic monitoring for a power machine such as the skid steer loader 400 illustrated in FIG. 8. As shown in step 450, selection of one or more diagnostic items from a diagnostic menu is received. The diagnostic application retrieves sensor data from sensors coupled to power machine via the diagnostic component 120 for the one or more selected items as illustrated in step 452. The sensor data is displayed using display formats selected from an options menu of the diagnostic application as shown in step 454. Various display formats can be selected to facilitate analysis of the sensor data by a technician or diagnostic professional as described. In the embodiments described, the diagnostic and display options menus are generated through a graphical user interface component 122. Items on the menu are selected through an input device 126 operable with the graphical user interface. Although the application describes a "point and click" device for menu selection, other input devices can be used and application is not limited to a particular input device 126.

Although the present invention has been described with reference to preferred embodiments, workers skilled in the art will recognize that changes may be made in form and detail without departing from the spirit and scope of the invention.

What is claimed is:

1. A diagnostic application for a mobile power vehicle implementable on a computer readable medium comprising:
   a diagnostic component configured to receive sensor data from a sensor on the mobile power vehicle for one or more user selectable diagnostic items; and
   a diagnostic menu generator configured to generate a diagnostic menu including a plurality of user selectable diagnostic items on an electronic display device and a display options menu generator configured to generate a display options menu on the electronic display device including a plurality of user selectable display formats to display the sensor data for the one or more user selectable diagnostic items wherein the display options menu includes a composite graph display format and a segregated graph display format and upon selection of the composite graph display format the diagnostic application generates a scrollable graphical display segment including one or more graphs and upon selection of the segregated graphical display format the diagnostic application generates a plurality of scrollable graphical display segments for the one or more user selectable diagnostic items.

2. A diagnostic application for a mobile power vehicle implementable on a computer readable medium comprising:
a diagnostic component configured to receive sensor data from a sensor on the mobile power vehicle for one or more user selectable diagnostic items; and
a diagnostic menu generator configured to generate a diagnostic menu including a plurality of user selectable diagnostic items on an electronic display device and a display options menu generator configured to generate a display options menu on the electronic display device including a plurality of user selectable display formats to display the sensor data for the one or more user selectable diagnostic items wherein the display options menu includes a graphical display format and a list view display format and upon selection of the graphical display format the diagnostic application generates a scrollable graphical display segment and upon selection of the list view display format the diagnostic application generates an alphanumerical display of the sensor data for the one or more user selectable diagnostic items.

3. A computer implementable method of providing diagnostic monitoring of a mobile power vehicle, the method comprising the steps of:
retrieving sensor data from one or more sensors coupled to the mobile power vehicle for one or more diagnostic items;
displaying a maximum sensor reading or a minimum sensor reading retrieved from the one or more sensors coupled to the mobile power vehicle in a display field on an electronic display device;
receiving an input command to display an acceptable maximum or minimum sensor value for the one or more diagnostic items;
retrieving the acceptable maximum or minimum sensor value for the one or more diagnostic items from a data store; and
displaying the acceptable maximum or minimum sensor value for the one or more diagnostic items in the display field of the electronic display device in place of the maximum or minimum sensor reading.

4. A diagnostic system for a mobile power vehicle comprising:
a diagnostic component configured to retrieve sensor data from at least one sensor on a mobile power vehicle for one or more diagnostic items;
a graphical display generator configured to generate a scrollable graphical display segment on an electronic display device to display the sensor data for the one or more diagnostic items along a time axis and the scrollable graphical display segment being scrollable along the time axis to scroll in a first direction to view past data and scrollable in a second direction to view current data; and
a display options menu including a plurality of user selectable display formats including a first display format and a second display format and upon selection of the first display format the graphical display generator generates the scrollable graphical display segment including a plurality of graphs along a common time axis and upon selection of the second display format the graphical display generator generates a plurality of scrollable graphical display segments scrollable along separate time axes.

5. The diagnostic application of claim 1 wherein the retrieval of the sensor data is controlled via start or stop function buttons on the electronic display device.

6. The method of claim 3 and further comprising the steps of:
graphically displaying the sensor data for the one or more sensors;
receiving an input to display a numerical value for a select data point on the graphical display; and
displaying the numerical value associated with the select data point on the graphical display.

7. The method of claim 3 and further comprising the steps of:
receiving a display option selection; and
graphically displaying the sensor data using the selected display option.

8. The method of claim 7 and comprising:
displaying a scrollable graphical display including a plurality of line graphs along a time axis of the scrollable graphical display if a first display option is selected; and
displaying a plurality of scrollable graphical displays if a second display option is selected.

9. The method of claim 3 and comprises:
processing input from a pointing device to determine a position of a cursor on the electronic display device; and
retrieving the acceptable maximum or minimum sensor value and displaying the acceptable maximum or minimum sensor value if the cursor is positioned proximate to the display field of the maximum or the minimum sensor reading.

10. The diagnostic system of claim 2 wherein the scrollable graphical display segment includes a plurality of graphs for the plurality of user selectable diagnostic items from a plurality of sensors on the mobile power vehicle.

11. The diagnostic system of claim 10 wherein the plurality of graphs have a plurality of different display colors.

12. The diagnostic system of claim 10 wherein the display option menu on the electronic display device includes a plurality of different user selectable display colors for the plurality of graphs.

13. The diagnostic system of claim 10 and comprising a legend including one or more legend keys to associate each of the plurality of graphs to an associated diagnostic item or sensor.

14. The diagnostic system of claim 2 including a plurality of scrollable graphical display segments to display the sensor data for the one or more user selectable diagnostic items along a time axis and the plurality of scrollable graphical display segments being scrollable along the time axis to scroll in a first direction to view past data and to scroll in a second direction to view current data.

15. The diagnostic system of claim 14 wherein the plurality of scrollable graphical display segments have different display colors and the different display colors for the plurality of scrollable graphical display segments are selectable via the display options menu.

16. The diagnostic application of claim 2 and comprising a service tool controller and the diagnostic application retrieves the sensor data via communication to a controller area network CAN on the mobile power vehicle through the service tool controller.

17. The diagnostic application of claim 16 wherein the service tool controller converts a communication protocol of the CAN to a communication protocol of the diagnostic application.

18. The diagnostic application of claim 1 wherein the scrollable graphical display segment includes a plurality of graphs and the plurality of graphs are distinguished via a display legend.

19. The diagnostic system of claim 4 wherein the diagnostic component retrieves the sensor data via communication to a controller area network CAN on the mobile power vehicle through a service tool controller and the service tool controller converts a communication protocol of the CAN to a communication protocol of the diagnostic component.

\* \* \* \* \*